US010400935B1

(12) United States Patent
Kim et al.

(10) Patent No.: US 10,400,935 B1
(45) Date of Patent: Sep. 3, 2019

(54) APPARATUS FOR FORMING NON-EXCAVATION WATER AND SEWAGE PIPE LINING FOR REHABILITATION USING TEXTILE GRID REINFORCEMENT MEMBER AND MORTAR LINING, AND METHOD THEREOF

(71) Applicant: KOREA INSTITUTE OF CIVIL ENGINEERING AND BUILDING TECHNOLOGY, Gyeonggi-do (KR)

(72) Inventors: Hyeong Yeol Kim, Gyeonggi-do (KR); Gum Sung Ryu, Gyeonggi-do (KR)

(73) Assignee: KOREA INSTITUTE OF CIVIL ENGINEERING AND BUILDING TECHNOLOGY, Gyeonggi-do (KR)

( * ) Notice: Subject to any disclaimer, the term of this patent is extended or adjusted under 35 U.S.C. 154(b) by 0 days.

(21) Appl. No.: 16/174,285

(22) Filed: Oct. 30, 2018

(30) Foreign Application Priority Data

Aug. 10, 2018 (KR) .......................... 10-2018-0093536

(51) Int. Cl.
*F16L 55/1645* (2006.01)
*F16L 58/04* (2006.01)

(52) U.S. Cl.
CPC ........... *F16L 58/04* (2013.01); *F16L 55/1645* (2013.01)

(58) Field of Classification Search
CPC ....... F16L 58/04; F16L 58/06; F16L 55/1645; F16L 55/18; F16L 55/163; F16L 55/1655; F16L 55/1653; B05C 7/08; B05C 11/023; B05B 13/0636; B05B 3/1007; B05D 7/222; B28B 19/0023; E03F 2003/065
See application file for complete search history.

(56) References Cited

U.S. PATENT DOCUMENTS 2,917,820 A * 12/1959 Matheny ............. B28B 19/0023
219/58
3,599,299 A * 8/1971 Padgett ............... B05B 13/0636
425/110

(Continued)

FOREIGN PATENT DOCUMENTS

JP            2657730       9/1997
JP         2008533405       8/2008

(Continued)

*Primary Examiner* — Carib A Oquendo
(74) *Attorney, Agent, or Firm* — JCIPRNET

(57) ABSTRACT

Provided are an apparatus for forming non-excavation water and sewage pipe lining for rehabilitation using a textile grid reinforcement material and mortar lining, which allows a textile grid reinforcement material to be continuously disposed and mortar lining to be formed thereon when an old water and sewage pipe is rehabilitated by forming mortar lining in the old water and sewage pipe to fundamentally suppress fine cracks generated on the coated mortar lining, allows the textile grid reinforcement material, to be applied so as to solve a problem of corrosion of the reinforcement material generated when a conventional reinforcing bar or a wire mesh is applied, and in comparison to a conventional method of forming lining of only mortar, allows the textile grid reinforcement material to be applied to reduce a thickness of mortar lining and to perform continuous construction so as to perform economical construction, and a method thereof.

17 Claims, 11 Drawing Sheets

(56) References Cited

U.S. PATENT DOCUMENTS

| | | | | |
|---|---|---|---|---|
| 4,256,445 A * | 3/1981 | Pingree | ............... | B28B 19/0023 |
| | | | | 425/101 |
| 4,415,390 A * | 11/1983 | Smith | ..................... | B65H 81/08 |
| | | | | 156/187 |
| 4,810,453 A * | 3/1989 | Clarke | .................. | B29C 63/341 |
| | | | | 138/97 |
| 5,246,641 A * | 9/1993 | Perkins | ............... | C04B 40/0231 |
| | | | | 138/97 |
| 5,443,377 A * | 8/1995 | Perkins | ............... | C04B 40/0231 |
| | | | | 118/105 |
| 5,501,248 A | 3/1996 | Kiest, Jr. | | |
| 5,656,117 A * | 8/1997 | Wood | .................... | B29C 63/343 |
| | | | | 138/97 |
| 9,095,866 B2 * | 8/2015 | Gesicki | ................. | B05B 3/1007 |
| 2009/0129869 A1 * | 5/2009 | Zivanovic | ........... | F16L 55/1655 |
| | | | | 405/184.2 |
| 2010/0301505 A1 * | 12/2010 | Kiest, Jr. | ............. | F16L 55/1651 |
| | | | | 264/36.16 |
| 2011/0280665 A1 * | 11/2011 | Emmons | ............. | F16L 55/1655 |
| | | | | 405/184.2 |

FOREIGN PATENT DOCUMENTS

| | | |
|---|---|---|
| KR | 100470353 | 2/2005 |
| KR | 100623827 | 9/2006 |
| KR | 20090058408 | 6/2009 |
| KR | 101109660 | 1/2012 |
| KR | 20170089754 | 8/2017 |
| KR | 101839861 | 3/2018 |

* cited by examiner

APPARATUS FOR FORMING NON-EXCAVATION WATER AND SEWAGE PIPE LINING FOR REHABILITATION USING TEXTILE GRID REINFORCEMENT MEMBER AND MORTAR LINING, AND METHOD THEREOF

CROSS-REFERENCE TO RELATED APPLICATION

This application claims priority to and the benefit of Korean Patent Application No. 10-2018-0093536, filed on Aug. 10, 2018, the disclosure of which is incorporated herein by reference in its entirety.

BACKGROUND

1. Field of the Invention

The present disclosure relates to an apparatus for forming non-excavation water and sewage pipe lining for rehabilitation, and more specifically, to an apparatus for forming non-excavation water and sewage pipe lining for rehabilitation which allows mortar lining to be formed on an upper portion of a continuously disposed textile grid reinforcement material when the mortar lining is formed in an old water and sewage pipe to be rehabilitated.

2. Discussion of Related Art

Generally, when infrastructure is designed and established, water supply pipes, sewage pipes, and conduits for industry, such as electricity, communications, and the like, are buried underground so as to allow drinking water, gas, and communications necessary for living to be supplied and sewage to be discharged through the sewage pipe.

However, since the conduits get old as time passes, repair is necessarily required. Particularly, when the water supply pipe corrodes, a huge amount of water is leaked to the underground, drinking water is contaminated due to rusty water, and thus many inconveniences are caused with drinking water and as related to living. Further, when the sewage pipe corrodes such as to cause a crack, and sewage flows outside the pipe, environment pollution, such as groundwater and soil pollution, may be caused.

Conventionally, in order to maintain the water and sewage pipes, a road (ground) under which the conduit is buried is excavated, and an old conduit is replaced with a new conduit or repaired. However, the ground excavation method causes damage to an ambient environment, ground subsidence caused by erosion of soil after construction, and traffic congestion and inconvenience for citizens in crowded urban areas.

To solve the above-described problems, a non-excavation maintenance apparatus for a conduit which allows a crack of an old buried conduit to be filled by inserting a reinforcing tube into an old buried conduit with a crack without excavating the ground and supplying hot steam into the reinforcing tube to be stuck to an inner wall of the old conduit to be impregnated while the reinforcing tube thermally expands, and a method using the same are disclosed. Therefore, road excavation construction is not required, construction can be easily performed, and a construction period can be reduced.

Meanwhile, as a conventional art, Korean Registration Patent No. 10-470353 discloses "Ceramic Mortar Lining Method for Water and Sewage Pipe Rehabilitation," and the towing-type plastering lining method, which is a method of spraying mortar into a tube and completing lining using a cone-type drag trowel, is described with reference to FIG. 1.

FIG. 1 is a cross-sectional view for describing a ceramic mortar lining method for water and sewage pipe reinforcement according to a conventional art.

Referring to FIG. 1, the mortar lining method for water and sewage pipe reinforcement according to the conventional art, which is a method of processing lining by forming holes for work on both sides of an old buried water and sewage pipe 10, inserting a scraper and high temperature and high pressure water spray head into the water and sewage pipe 10 between both holes to remove scales, supplying heat into the water and sewage pipe 10, from which the scales are removed, to dry water, and spraying ceramic mortar to an inner surface of the water and sewage pipe 10 from which scales are removed, includes: forming a ceramic mortar layer 20 on an inner surface of the water and sewage pipe 10 using an air motor 50 operated by high pressure air supplied from an air hose 61 and an impeller 40 radially spraying ceramic mortar supplied from a ceramic mortar supply hose 62 by being rotated by the air motor 50; and plastering the inner wall of the water and sewage pipe 10 with a uniform thickness of the ceramic mortar layer 20 by moving a plastering iron 30 in one direction, the plastering iron 30, which is connected to a connector installed on an impeller 40, has one side fixed by a holder and the other side opened outward by tension of a leaf spring installed on an inner surface thereof, and made of a metal plate that comes into contact with an inner surface of the old water and sewage pipe 10 on which the ceramic mortar layer 20, is formed.

The ceramic mortar lining method for water and sewage pipe reinforcement according to the conventional art allows a surface of the water and sewage pipe 10 to be smooth and have a uniform thickness of lining, thereby reducing friction resistance of water flowing in the water and sewage pipe 10 using the plastering iron 30.

Meanwhile, as another conventional art, Korean Registration Patent No. 10-623827 discloses "Rotating Trowel Lining Method For Water And Sewage Pipe Rehabilitation" which is a rotating plastering lining method of completing lining using a rotating trowel that sprays mortar into an old water and sewage pipe and rotates and will be described with reference to FIG. 2.

FIG. 2 is a view for describing an apparatus used for the rotating trowel lining method for water and sewage pipe reinforcement according to the conventional art.

As shown in FIG. 2, the rotating trowel lining method for water and sewage pipe reinforcement according to the conventional art includes: spraying ceramic mortar into an inner circumferential surface of the water and sewage pipe 10 through a spray head; and plastering the water and sewage pipe 10 with the ceramic mortar with a uniform thickness by using the plastering iron including a rotating plate 81 installed at a front end of the spray head and rotated by power of a motor, brackets 82 installed on both sides of the rotating plate, and scratching plates 70 which are attached to front ends of rods 83 coupled to the brackets 82 so that a length thereof vertically is adjusted, are manufactured in different sizes, come into contact with an inner circumferential surface of the water and sewage pipe 10 by elasticity of the spring 426d, and are rotated by operation of the rotation plate 81.

According to the rotating trowel lining method for water and sewage pipe reinforcement according to the conventional art, an plastering iron is installed at a front end of the lining apparatus for spraying ceramic mortar into an inner circumferential surface of a water and sewage pipe so as to plaster the water and sewage pipe with the sprayed ceramic mortar with an uniform thickness.

However, a method for rehabilitating a water and sewage pipe using the mortar lining method according to the conventional art has the following problems. In the mortar lining method according to the conventional art, since the lining is formed by spray pressure, construction quality is low. When the lining is formed of only mortar, a minimum thickness of mortar should be greater than or equal to 30 mm for crack prevention, and thus a water passing cross section of the water and sewage pipe is greatly reduced after the water and sewage pipe reinforcement. Further, the plastering mortar lining method according to the conventional art forms a thin mortar lining in the water and sewage pipe, and thus it is preferable that high strength mortar should be constructed due to the mortar being thin, but the high strength mortar has problems of having fine cracks caused by drying shrinkage after construction, and cracks and delamination caused by an internal or external environment load when in use. Further, a reinforcement material, such as a reinforcing bar, a wire mesh, a combined textile grid, and the like, may be formed on a cross section of the mortar but may not be continuously disposed.

PATENT LITERATURE (Patent Document 0001) Korean Registration Patent No. 10-623827 (Filed on Oct. 27, 2004), Title of Invention: "Rotating Trowel Lining Method for Water and Sewage Pipe Rehabilitation"

(Patent Document 0002) Korean Laid-open Patent Application No. 2009-58408 (Published on Sep. 6, 2006), Title of Invention: "Multifunctional Repairing and Reinforcing Robot for Underground Conduit"

(Patent Document 0003) Korean Registration Patent No. 10-1839861 (Filed on Sep. 7, 2017), Title of Invention: "Apparatus for Installing Water and Sewage Pipe Lining Tube"

(Patent Document 0004) Korean Registration Patent No. 10-1109660 (Filed on Aug. 30, 2011), Title of Invention: "Method of Repairing Non-Excavation Water and Sewage Pipe and Apparatus Therefor"

(Patent Document 0005) Korean Registration Patent No. 10-470353 (Filed on Apr. 19, 2002), Title of Invention: "Ceramic Mortar Lining Method for Water and Sewage Pipe Rehabilitation"

(Patent Document 0006) Korean Laid-open Patent Application No. 2017-89754 (Published on Aug. 4, 2017), Title of Invention: "Variable Reversing Apparatus for Repairing Non-Excavation Water and Sewage Pipe and Method for Repairing Non-Excavation Water and Sewage Pipe using the Same"

(Patent Document 0007) Japanese Laid-Open Patent Application No. 2008-533405 (Published on Aug. 21, 2008), Title of Invention: "Non-Excavation Repairing Member of Conduit and Method of Repairing the Same"

(Patent Document 0008) Japanese Patent Application No. 2,657,730 (Filed on Mar. 19, 1992), Title of Invention: "Coated Body for Repairing Conduit"

SUMMARY OF THE INVENTION

The present disclosure is directed to providing an apparatus for forming non-excavation water and sewage pipe lining for rehabilitation using a textile grid reinforcement material and mortar lining which is capable of preventing fine cracks that may be generated on mortar lining by forming the mortar lining on an upper portion of a continuously disposed textile grid reinforcement material when water and sewage pipe is rehabilitated by forming mortar lining in an old water and sewage pipe, and a method thereof.

The present disclosure is directed to providing an apparatus for forming non-excavation water and sewage pipe lining for rehabilitation using a textile grid reinforcement material and mortar lining which is capable of preventing corrosion of a reinforcement material that may be generated when a conventional reinforcing bar or a wire mesh is applied by applying a textile grid reinforcement material, which is a high strength composite material, so that a thickness of mortar lining may be reduced and continuous construction may be performed, and a method thereof.

According to an aspect of the present disclosure, there are provided an apparatus for forming non-excavation water and sewage pipe lining for rehabilitation using a textile grid reinforcement material and mortar lining which includes a work vehicle disposed in a water and sewage pipe and towed or self-driven along a lower surface of the water and sewage pipe, a textile grid disposing apparatus including a bobbin around which a textile grid reinforcement material is wound in a roll form and rotatably mounted on the work vehicle so that the textile grid reinforcement material is disposed to be pressed against an inner circumferential surface of the water and sewage pipe, a mortar nozzle mounted on the work vehicle and configured to apply mortar so that the textile grid reinforcement material is attached to a wall of the water and sewage pipe, and a cone-type drag trowel which is a cone-shaped plastering tool installed on a rear side of the work vehicle, connected to the work vehicle by connection rods, and configured to form mortar lining by finishing the mortar applied through the mortar nozzle, wherein the textile grid reinforcement material is continuously disposed on a wall of the water and sewage pipe and configured to form rehabilitation lining for the water and sewage pipe by applying the mortar to the textile grid reinforcement material through the mortar nozzle.

The textile grid reinforcement material wound around the bobbin in a roll form may be disposed in the water and sewage pipe while the work vehicle moves in the water and sewage pipe, an upper surface of the textile grid reinforcement material may be coated with the mortar through a plurality of mortar nozzles, the textile grid reinforcement material with a predetermined thickness may be attached to an inner circumferential surface of the water and sewage pipe while the cone-type drag trowel passes through a portion coated with the mortar, and the mortar lining may be completed.

The textile grid disposing apparatus may be operated by a driving motor mounted in the work vehicle, and the gear box may allow a rotation speed thereof to be automatically adjusted according to a movement distance of a work vehicle wheel and an inner diameter of the water and sewage pipe.

The textile grid disposing apparatus may include an outer pulley rotatably formed outside of one side of the work vehicle, a connection shaft, which is connected to one side of the outer pulley and has an adjustable length, and connected with a bobbin shaft and a textile attachment-disposing rod, and the disposed textile grid reinforcement material unwound from the bobbin may be attached to an inner side of the water and sewage pipe by the textile attachment-disposing rod.

The outer pulley may be supported on an outer surface of a cage by a pair of taper bearings formed on an inner surface thereof, an internal gear may be provided in an inner center of the outer pulley and may receive power, which is transferred from the gear box, from an outer gear to rotate, and the cage may have an opening so that the internal gear and the outer gear are engaged.

The bobbin shaft and the connection shaft may be connected by a hinge to have a predetermined angle therebetween.

The cone-type drag trowel may include a plurality of plastering scrapers formed on one side of a propelling head and connected by a rivet to be formed in an expanding or contracting structure and a sliding plate installed in the cone-type drag trowel to adjust a length of second connection rod between the propelling head and a sliding plate so as to accurately adjust a diameter of the plastering scraper.

The apparatus for forming non-excavation water and sewage pipe lining for rehabilitation using a textile grid reinforcement material and mortar lining may further include at least one camera mounted on a front side or a rear side of the work vehicle to capture an image of the inside of the water and sewage pipe and may transfer the image to an external worker's terminal through a communication line.

A driving speed of the work vehicle, an amount of sprayed mortar of the mortar nozzle, and attachment of the textile grid reinforcement material may be adjusted while the image captured by the camera is monitored through the external worker's terminal.

According to another aspect of the present disclosure, there is provided a method for forming non-excavation water and sewage pipe lining for rehabilitation using a textile grid reinforcement material and mortar lining which includes steps of (a) checking a water and sewage pipe to determine whether rehabilitation lining is to be formed, (b) cleaning and washing the water and sewage pipe which is subject to the rehabilitation lining, (c) insertion-disposing an apparatus for forming non-excavation water and sewage pipe lining for rehabilitation including a work vehicle, a textile grid disposing apparatus, a mortar nozzle, and a cone-type drag trowel at a predetermined position in the water and sewage pipe, (d) disposing a textile grid reinforcement material to be pressed against an inner circumferential surface of the water and sewage pipe using the textile grid disposing apparatus while the work vehicle moves, (e) spraying mortar onto an upper surface of the textile grid reinforcement material through the mortar nozzle, (f) forming mortar lining using a cone-type drag trowel, and (g) checking the water and sewage pipe on which the mortar lining is formed, wherein the textile grid reinforcement material in operation (d) is continuously disposed on a wall of the water and sewage pipe, the mortar nozzle applies the mortar to the textile grid reinforcement material to form water and sewage pipe lining for rehabilitation is formed.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings.

DETAILED DESCRIPTION OF EXEMPLARY EMBODIMENTS

Figure 1:
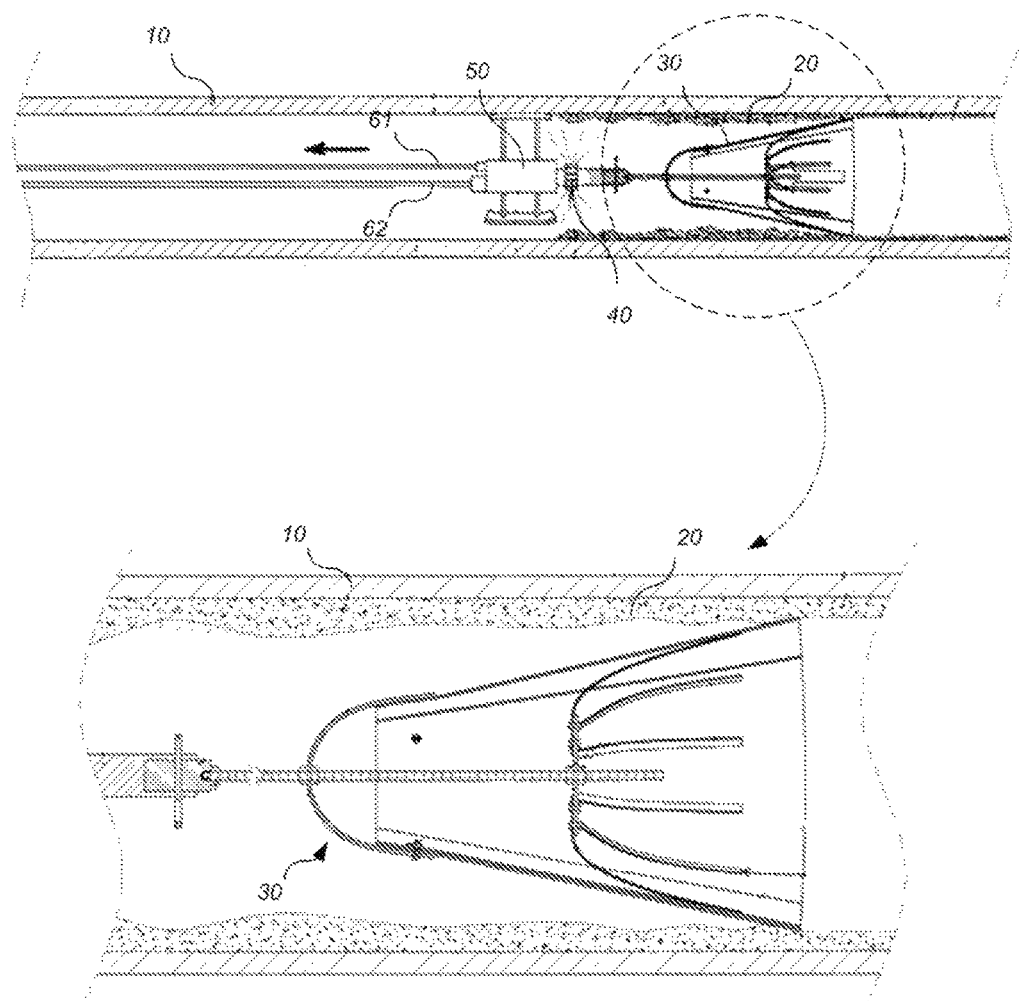
FIG. 1 is a cross-sectional view for describing a ceramic mortar lining method for water and sewage pipe reinforcement according to a conventional art.
Figure 2:
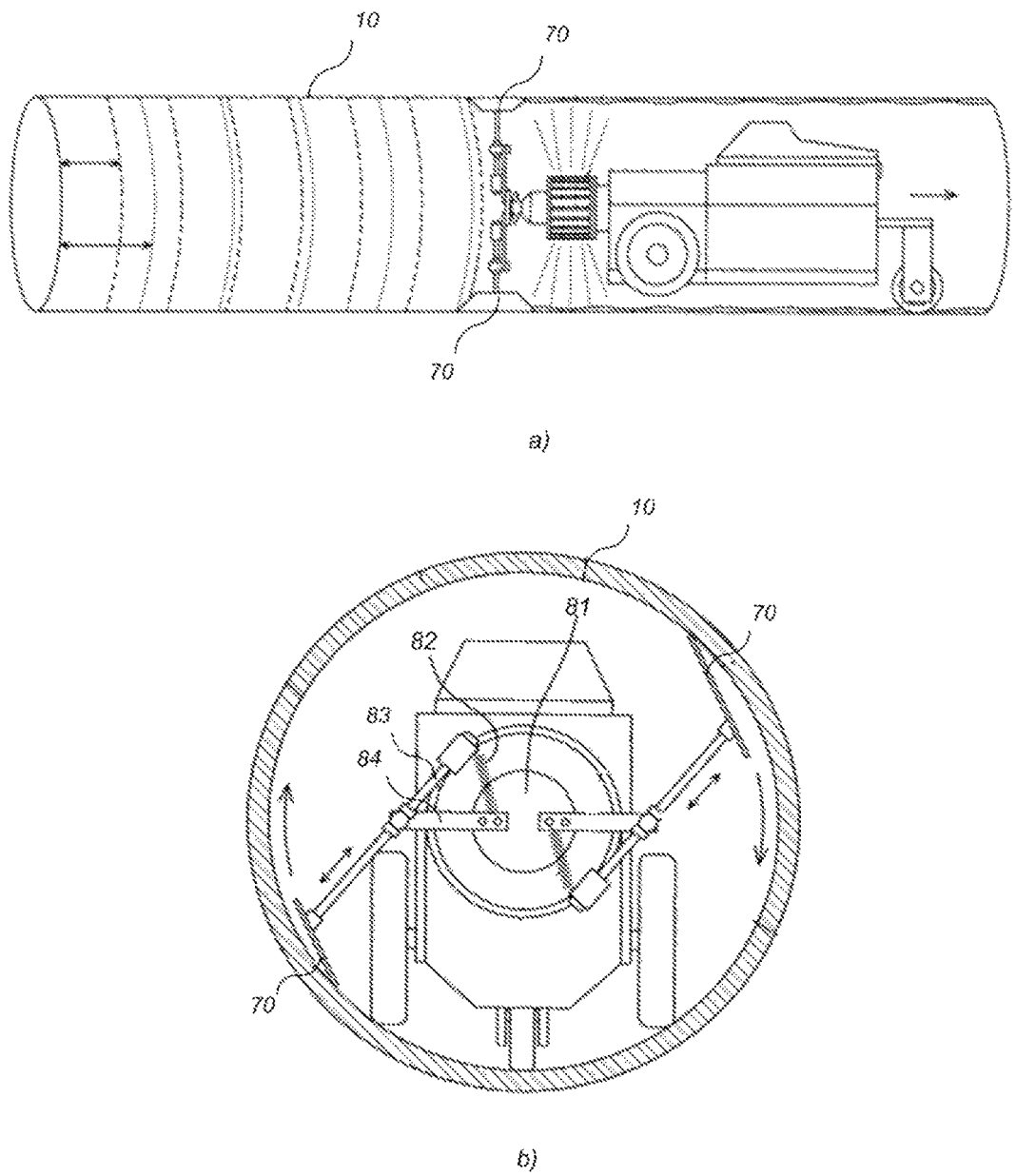
FIG. 2 is a view for describing an apparatus used for a rotating trowel lining method for water and sewage pipe reinforcement according to the conventional art.

Hereinafter, embodiments that are easily performed by those skilled in the art will be described in detail with reference to the accompanying drawings. However, the embodiments of the present disclosure may be implemented in several different forms and are not limited to the embodiments described herein. In addition, parts irrelevant to description will be omitted in the drawings to clearly explain the embodiments of the present disclosure. Similar parts are denoted by similar reference numerals throughout this specification.

Throughout the specification, when a portion "includes" an element, the portion may include the element or another element may be further included therein, unless otherwise described.

[Apparatus for Forming Non-Excavation Water and Sewage Lining for Rehabilitation Using Textile Grid Reinforcement Material and Mortar Lining]

Figure 3:
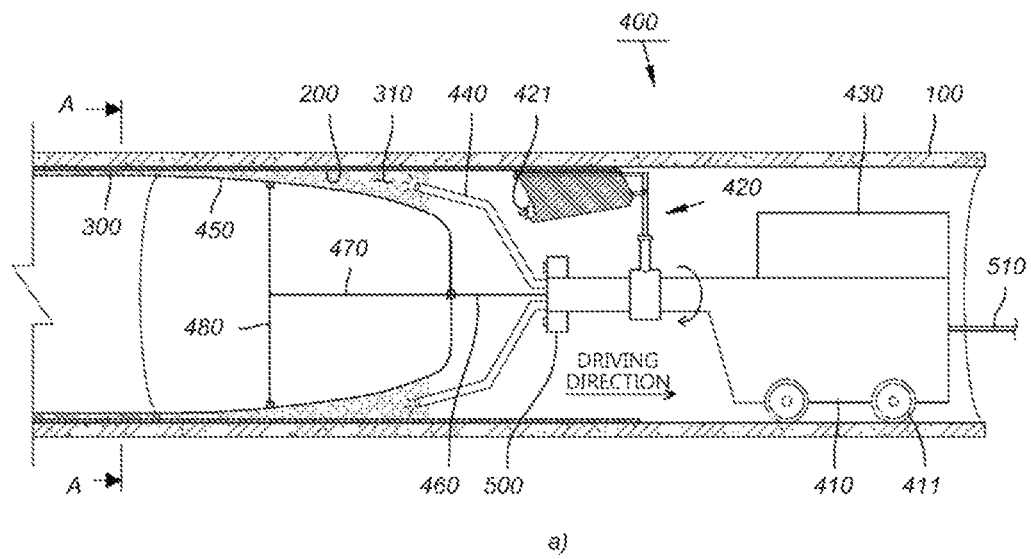
FIG. 3 is a view illustrating an apparatus for forming non-excavation water and sewage pipe lining for rehabilitation using a textile grid reinforcement material and mortar lining according to one embodiment of the present disclosure.
Figure 3:
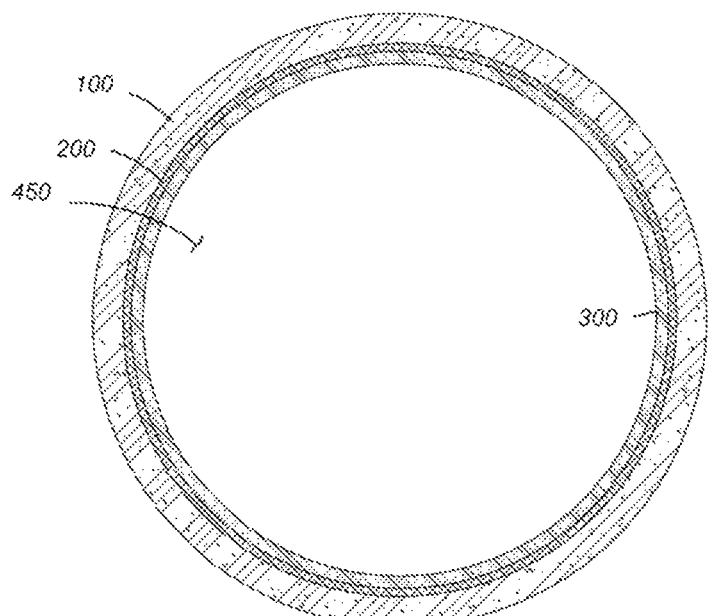

FIG. 3 is a view illustrating an apparatus for forming non-excavation water and sewage pipe lining for rehabilitation using a textile grid reinforcement material and mortar lining according to one embodiment of the present disclosure.

Referring to FIG. 3, the apparatus 400 for forming non-excavation water and sewage pipe lining for rehabilitation using a textile grid reinforcement material and mortar lining according to one embodiment of the present disclosure includes a work vehicle 410, a textile grid disposing apparatus 420, a mortar tank 430, a mortar nozzle 440, a cone-type drag trowel 450, a first connection rod 460, a second connection rod 470, a sliding plate 480, and a camera 500.

The work vehicle 410 is disposed in a water and sewage pipe 100 to be towed or self-driven along a lower surface of the water and sewage pipe 100. For example, when the work vehicle 410 is towed, a wire is connected to the front of the work vehicle 410, and the work vehicle 410 is towed and driven by an external worker. When the work vehicle 410 is self-driven, a work vehicle wheel 411 installed on the work vehicle 410 is driven using a control cable extending to the outside, and the work vehicle 410 may be driven thereby.

The textile grid disposing apparatus 420 includes a bobbin 421 around which a textile grid reinforcement material 200 is wound in a roll form, and the textile grid reinforcement material 200 is rotatably mounted on the work vehicle 410 to be continuously disposed to be pressed against a wall of the water and sewage pipe 100. Therefore, the textile grid reinforcement material 200 is wound around the bobbin 421 in a roll form and released while the work vehicle 410 moves to be attached to an inner circumferential surface of the water and sewage pipe 100 so as to reinforce the water and sewage pipe 100. In this case, the textile grid reinforcement material 200 is continuously disposed on a wall of the water and sewage pipe 100, and the textile grid reinforcement material 200 is coated with mortar 310 by the mortar nozzle 440, and thus rehabilitation lining of the water and sewage pipe 100 is formed. In this case, the textile grid disposing apparatus 420 will be described in detail with reference with FIG. 4.

The mortar nozzle 440 is mounted on the at least one work vehicle 410, and the textile grid reinforcement material 200 attached to a wall of the water and sewage pipe 100 is coated with the mortar 310 to form mortar lining 300.

The mortar tank 430 is mounted on the work vehicle 410 and supplies the mortar 310 being sprayed through the mortar nozzle 440.

The cone-type drag trowel 450, which is a cone-shaped plastering tool installed on a rear side of the work vehicle 410, is connected to the work vehicle 410 by first and second connection rods 460 and 470, and finishes the wall of the water and sewage pipe 100 by plastering with the mortar 310 sprayed from the mortar nozzle 440 so as to form the mortar lining 300.

In other words, the textile grid reinforcement material 200 wound around the bobbin 421 in a roll form is disposed in the water and sewage pipe 100 while the work vehicle 410 moves in the old water and sewage pipe 100 in a towed or self-driven manner, and an upper surface of the textile grid reinforcement material 200 is coated with the mortar 310 through a plurality of mortar nozzles 440 or a conventional spray method. In this case, the textile grid reinforcement material 200 with a predetermined thickness is attached to an inner circumferential surface of the water and sewage pipe 100 while the cone-type drag trowel 450 passes through a portion coated with the mortar 310, and the mortar lining 300 is completed.

Further, at least one camera 500 is mounted on a front side or a rear side of the work vehicle 410, captures an image of the inside of the water and sewage pipe 100, and transfers the image to an external worker's terminal (not shown) through a communication line 510 to allow the worker to adjust a movement speed of the work vehicle 410, an amount of sprayed mortar, and the like while monitoring a process in which the roll-type textile grid reinforcement material 200 is released and disposed in the water and sewage pipe 100 and an spray state of the mortar 310, and thus construction quality can be increased.

Figure 4A:
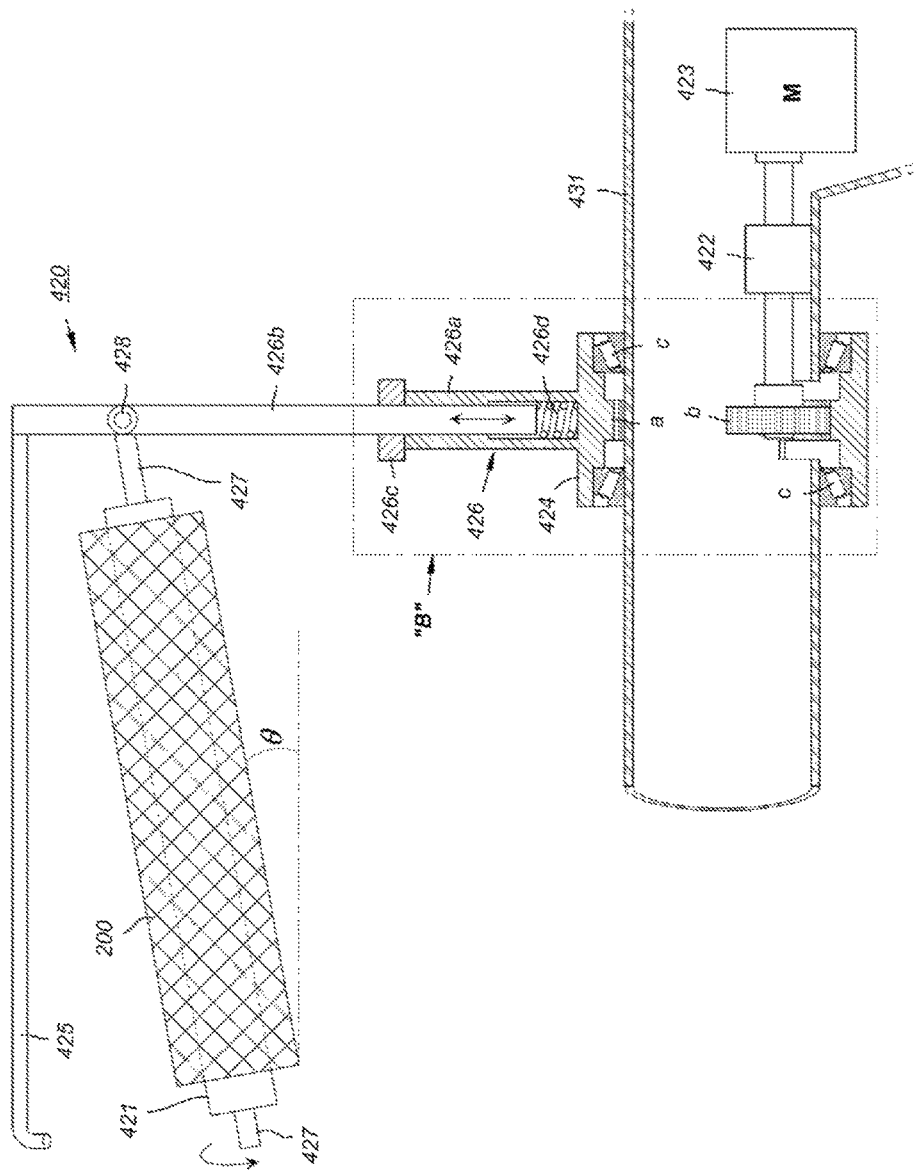
FIG. 4A is a detailed view illustrating a textile grid disposing device of the apparatus for forming non-excavation water and sewage pipe lining for rehabilitation using a textile grid reinforcement material and mortar lining according to one embodiment of the present disclosure.
Figure 4B:
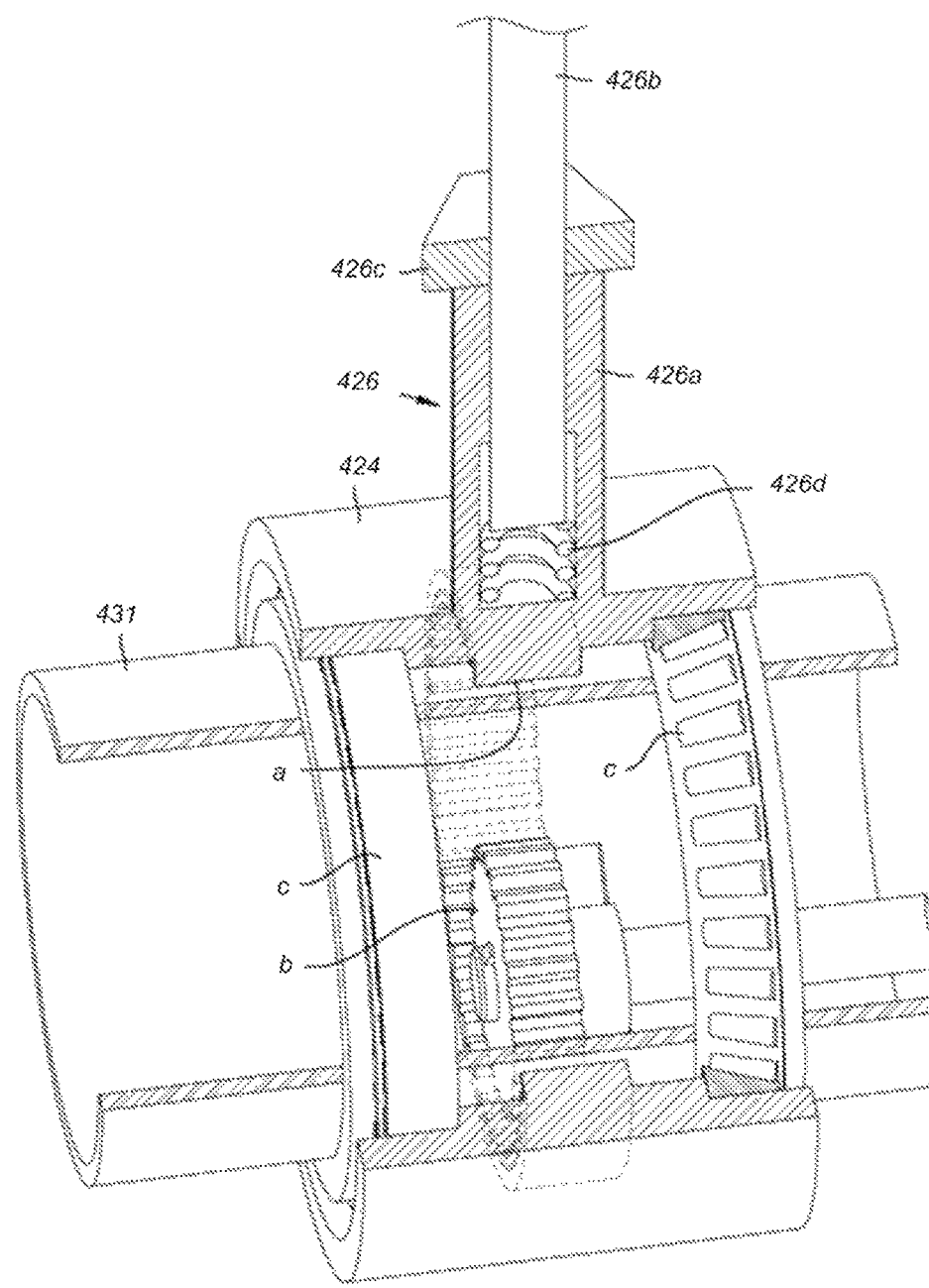
FIG. 4B is a detailed view illustrating an area B shown in FIG. 4A.

FIG. 4A is a detailed view illustrating a textile grid disposing device of the apparatus for forming non-excavation water and sewage pipe lining for rehabilitation using a textile grid reinforcement material and mortar lining according to one embodiment of the present disclosure, and FIG. 4B is a detailed view illustrating an area B shown in FIG. 4A.

Referring to FIG. 4A, the textile grid disposing apparatus 420 of the apparatus for forming non-excavation water and sewage pipe lining for rehabilitation using a textile grid reinforcement material and mortar lining according to one embodiment of the present disclosure may include a bobbin 421, a gear box 422, a driving motor 423, an outer pulley 424, a textile grid attachment-disposing rod 425, a connection shaft 426, a bobbin shaft 427, and a hinge 428.

As shown in FIG. 4A, the bobbin 421 of the textile grid disposing apparatus 420 according to one embodiment of the present disclosure is mounted on the work vehicle 410 and has the textile grid reinforcement material 200 wound therearound. Therefore, the textile grid reinforcement material 200 wound around the bobbin 421 is disposed to be pressed against the water and sewage pipe 100 while the work vehicle 410 moves in the degraded water and sewage pipe 100 in a towed or self-driven manner, and an upper surface of the textile grid reinforcement material 200 is coated with the mortar 310 through the plurality of mortar nozzles 440 or in a conventional spray method. In this case, the textile grid reinforcement material 200 with a predetermined thickness is attached to an inner circumferential surface of the water and sewage pipe 100 while the cone-type drag trowel 450 passes through a portion coated with the mortar 310, and the mortar lining 300 is completed.

Specifically, the textile grid disposing apparatus 420 according to one embodiment of the present disclosure is operated by the driving motor 423 mounted in the work vehicle 410, and the gear box 422 may allow a rotation speed thereof to be automatically adjusted according to an inner diameter of the water and sewage pipe and a movement distance of the work vehicle wheel 411.

Further, a cage 431 for the mortar nozzle 440 with a circular cross section is formed on one outer side opposing the movement direction of the work vehicle 410, a rotatable outer pulley 424 is formed on an outer portion of the cage 431, and a connection shaft 426 is connected to one side of the outer pulley 424.

As shown in FIG. 4B, the outer pulley 424 is supported on an outer surface of the cage 431 by a pair of taper bearings c formed on an inner surface thereof, and the internal gear a is provided in the center of the inner side of the outer pulley 424 and receives power transmitted from the gear box 422 from an outer gear b to rotate, and the cage 431 has an opening so that the internal gear a and the outer gear b are engaged.

In this case, the connection shaft 426 includes a first connection shaft 426a and a second connection shaft 426b, and the second connection shaft 426b is inserted into the first connection shaft 426a made of a circular pipe and is formed with a structure of fixing the second connection shaft 426b using a nut 426c provided on an upper end of the first connection shaft 426a, and thus a length of the connection shaft 426 may be appropriately adjusted according to a diameter of the water and sewage pipe 100. Further, the second connection shaft 426b is connected with the bobbin shaft 427 and the textile attachment-disposing rod 425.

The disposed textile grid reinforcement material 200 unwound from the bobbin 421 may include a spring 426d provided in the first connection shaft 426a which is manufactured as a circular pipe to be pressed more firmly to an inner portion of the water and sewage pipe 100 using the textile attachment-disposing rod 425.

Further, the bobbin shaft 427 and the second connection shaft 426b are connected by a hinge 428 to have a predetermined angle θ, for example, an acute angle, therebetween. For example, the hinge 428 may include a bolt and a nut, but the present disclosure is not limited thereto.

Further, the bobbin 421, around which the textile grid reinforcement material 200 is wound, is coupled to the bobbin shaft 427 and may be freely rotated.

Figure 5:
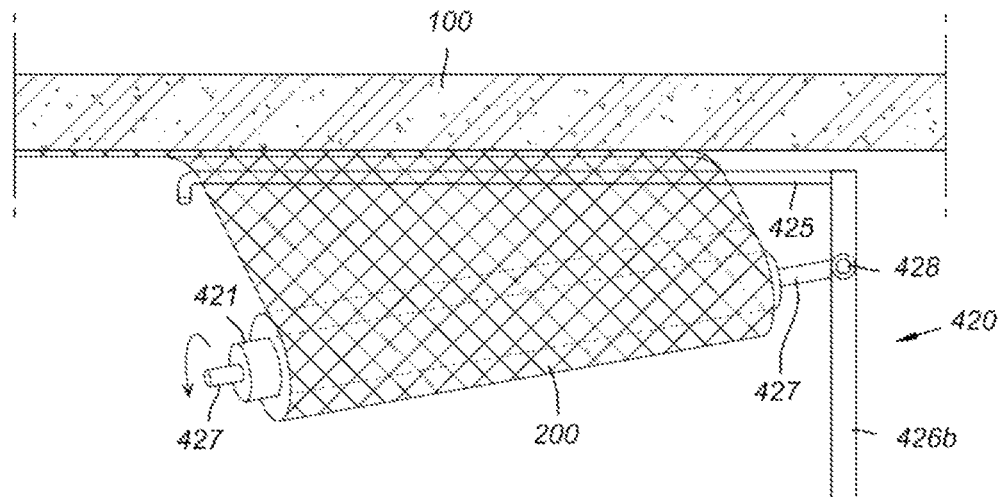
FIG. 5 is a detailed view for describing a textile grid reinforcement material of a water and sewage pipe of the apparatus for forming non-excavation water and sewage pipe lining for rehabilitation using a textile grid reinforcement material and mortar lining according to one embodiment of the present disclosure.
Figure 5:
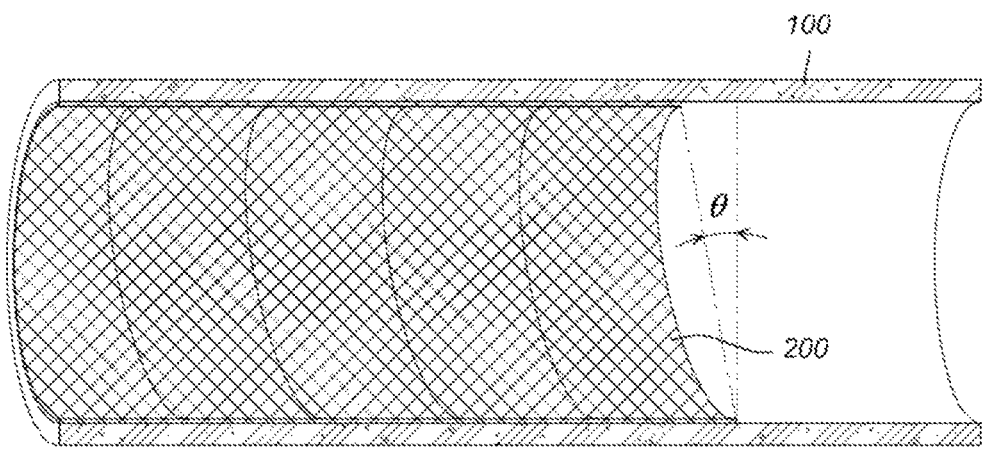

FIG. 5 is a detailed view for describing a textile grid reinforcement material in a water and sewage pipe of the apparatus for forming non-excavation water and sewage pipe lining for rehabilitation using a textile grid reinforcement material and mortar lining according to one embodiment of the present disclosure.

As shown in FIG. 5A, the disposed textile grid reinforcement material 200 unwound from the bobbin 421 is attached to an inside of the water and sewage pipe 100 by the textile attachment-disposing rod 425.

FIG. 5B is a view illustrating the textile grid reinforcement material continuously disposed in the water and sewage pipe. In the case of the apparatus for forming non-excavation water and sewage pipe lining for rehabilitation using a textile grid reinforcement material and mortar lining according to one embodiment of the present disclosure, to continuously dispose textile in the water and sewage pipe 100 as shown in FIG. 5B, as described above, an angle between a shaft of the bobbin 421 and the connection shaft 426 connected to the work vehicle 410 is an acute angle rather than a right angle. Therefore, the textile grid reinforcement material 200 may be continuously disposed in the water and sewage pipe 100.

Figure 6A:
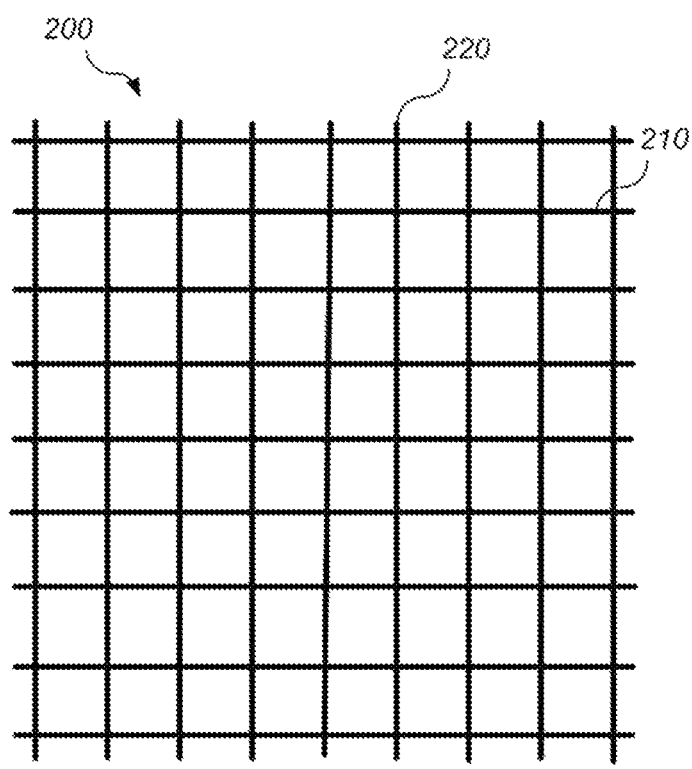
FIGS. 6A and 6B are views for describing a textile grid reinforcement material of the apparatus for forming non-excavation water and sewage pipe lining for rehabilitation using a textile grid reinforcement material and mortar lining according to one embodiment of the present disclosure, respectively.
Figure 6B:
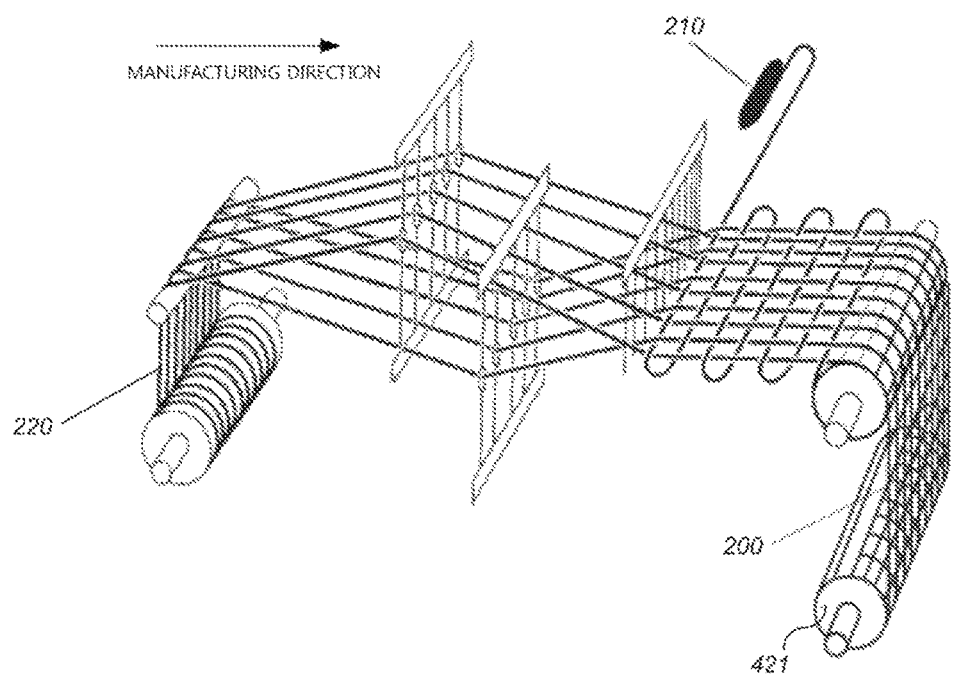

FIGS. 6A and 6B are views for describing a textile grid reinforcement material of the apparatus for Ruining non-excavation water and sewage pipe lining for rehabilitation using a textile grid reinforcement material and mortar lining according to one embodiment of the present disclosure, respectively, wherein FIG. 6A is a view illustrating a textile grid reinforcement material, and FIG. 6B is a view illustrating an apparatus for manufacturing the textile grid reinforcement material.

As shown in FIG. 6A, a high strength fiber is woven to have a lattice shape with the weft 210 and the warp 220 as a textile grid with a two-dimensional shape to reinforce an inner circumferential surface of the water and sewage pipe 100. Generally, it is preferable that the textile grid reinforcement material 200 is woven from carbon fiber, glass fiber, aramide fiber, and the like, in a grid shape and is partially impregnated in a thermosetting resin, such as an epoxy resin, a styrene-butadiene rubber (SBR) resin, and the like, after the weaving. For example, the textile grid reinforcement material 200 is manufactured with a width of approximately one to two meters and a length of hundreds of meters and is provided in a roll form to be wound around the bobbin 421.

Further, to weave the textile grid reinforcement material 200, as shown in FIG. 6B, a lattice-shaped textile grid may be woven in a method in which a plurality of wefts 210 and a plurality of warps 220 are coupled to cross each other and is provided in a roll form to be wound around the bobbin 421.

Therefore, in the case of the apparatus for forming non-excavation water and sewage pipe lining for rehabilitation using a textile grid reinforcement material and a mortar lining according to one embodiment of the present disclosure, the textile grid reinforcement material is manufactured and wound around the bobbin 421 in a roll form to continuously dispose the two-dimensional textile grid reinforcement material 200 in the water and sewage pipe 100, and the textile grid reinforcement material 200 is continuously disposed in the water and sewage pipe 100.

Figure 7:
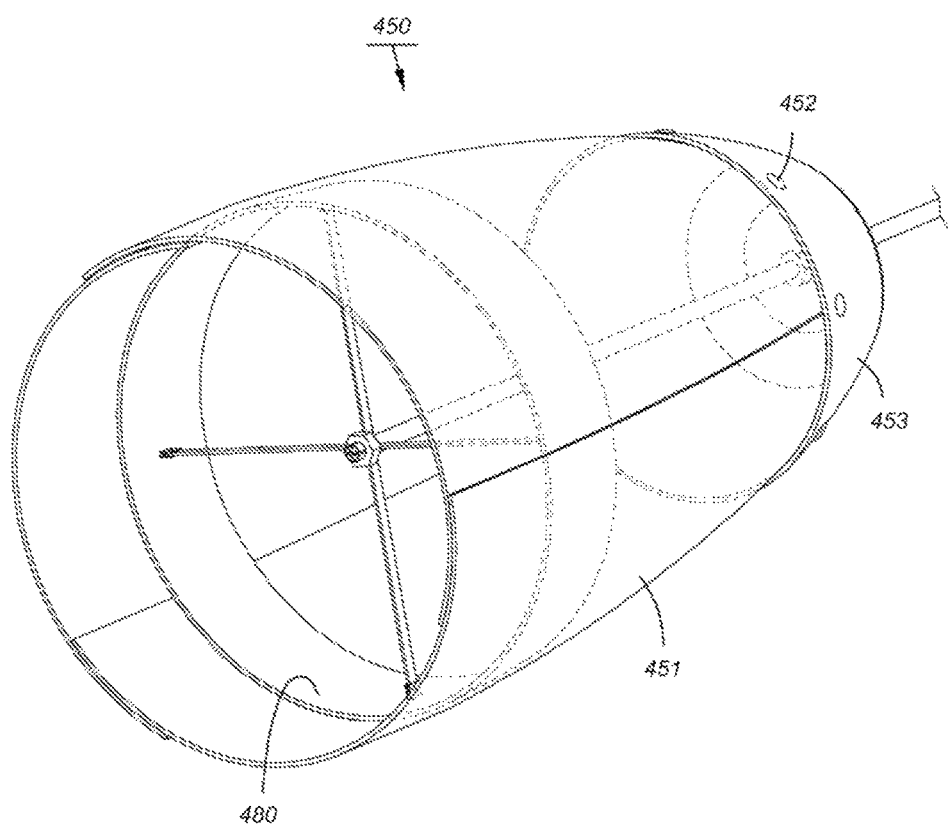
FIG. 7 is a detailed view for describing a cone-type drag trowel of the apparatus for forming non-excavation water and sewage pipe lining for rehabilitation using a textile grid reinforcement material and mortar lining according to one embodiment of the present disclosure.
Figure 8:
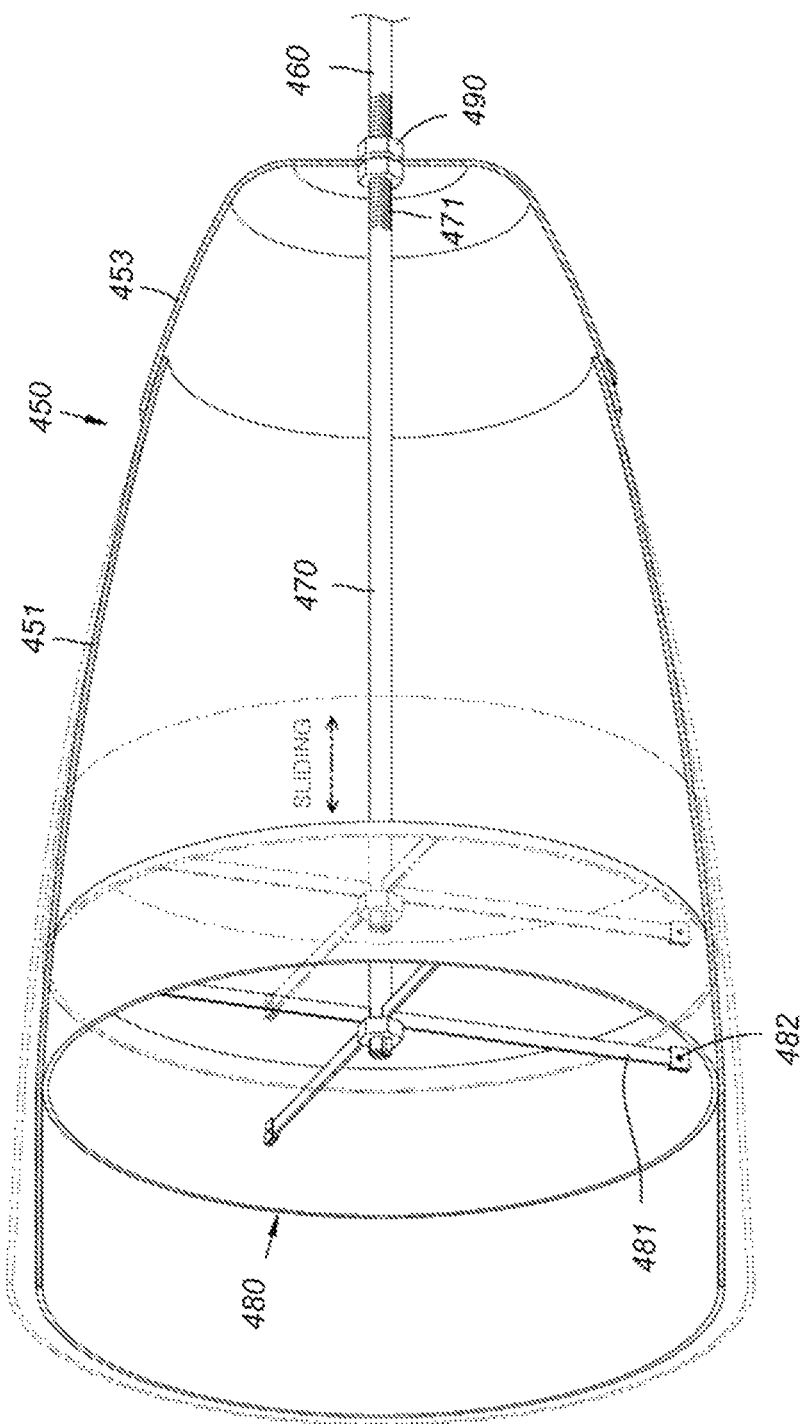
FIG. 8 is a detailed view for describing a connection rod and a sliding plate in the apparatus for forming non-excavation water and sewage pipe lining for rehabilitation using a textile grid reinforcement material and mortar lining according to one embodiment of the present disclosure.

FIG. 7 is a detailed view for describing a cone-type drag trowel of the apparatus for forming non-excavation water and sewage pipe lining for rehabilitation using a textile grid reinforcement material and mortar lining according to one embodiment of the present disclosure, and FIG. 8 is a detailed view for describing a connection rod and a sliding plate in the apparatus for forming non-excavation water and sewage pipe lining for rehabilitation using a textile grid reinforcement material and mortar lining according to one embodiment of the present disclosure.

As shown in FIG. 7, in the apparatus 400 for forming non-excavation water and sewage pipe lining for rehabilitation using mortar lining and a textile grid reinforcement material according to one embodiment of the present disclosure, since the cone-type drag trowel 450 includes a plurality of plastering scrapers 451 formed on one side of a propelling head 453 by the rivet 452 similarly to those used in a method according to a conventional art, the cone-type drag trowel 450 may be formed in an expanding or contracting structure. Further, as shown in FIG. 8, the sliding plate 480 is installed in the cone-type drag trowel 450 so that a length of the second connection rod 470 is adjusted between the propelling head 453 and the sliding plate 480, and thus a diameter of the plastering scraper 451 can be accurately adjusted. A screw thread 471 is formed on the second connection rod 470 passing through the propelling head 453, and nuts 490 may be provided on both sides of the screw thread 471. The sliding plate 480 is connected with the second connection rod 470 by two sliding plate connecting shafts 481, and in this case, the sliding plate 480 and the sliding plate connecting shaft 481 are connected by the rivet 482 and have a rotatable structure.

Therefore, in the case of the apparatus 400 for forming non-excavation water and sewage pipe lining for rehabilitation using mortar lining and a textile grid reinforcement material according to one embodiment of the present disclosure, the textile grid reinforcement material 200 wound around the bobbin 421 in a roll form is released when the work vehicle 410 moves, and the textile grid reinforcement material 200 is tensed with predetermined tensile force by friction between the propelling head 453 of the cone-type drag trowel 450 and the textile grid reinforcement material 200 and may be attached to an inner circumferential surface of the water and sewage pipe 100.

[Apparatus and Method for Forming Non-Excavation Water and Sewage Pipe Lining for Rehabilitation Using a Textile Grid Reinforcement Material and Mortar Lining]

Figure 9:
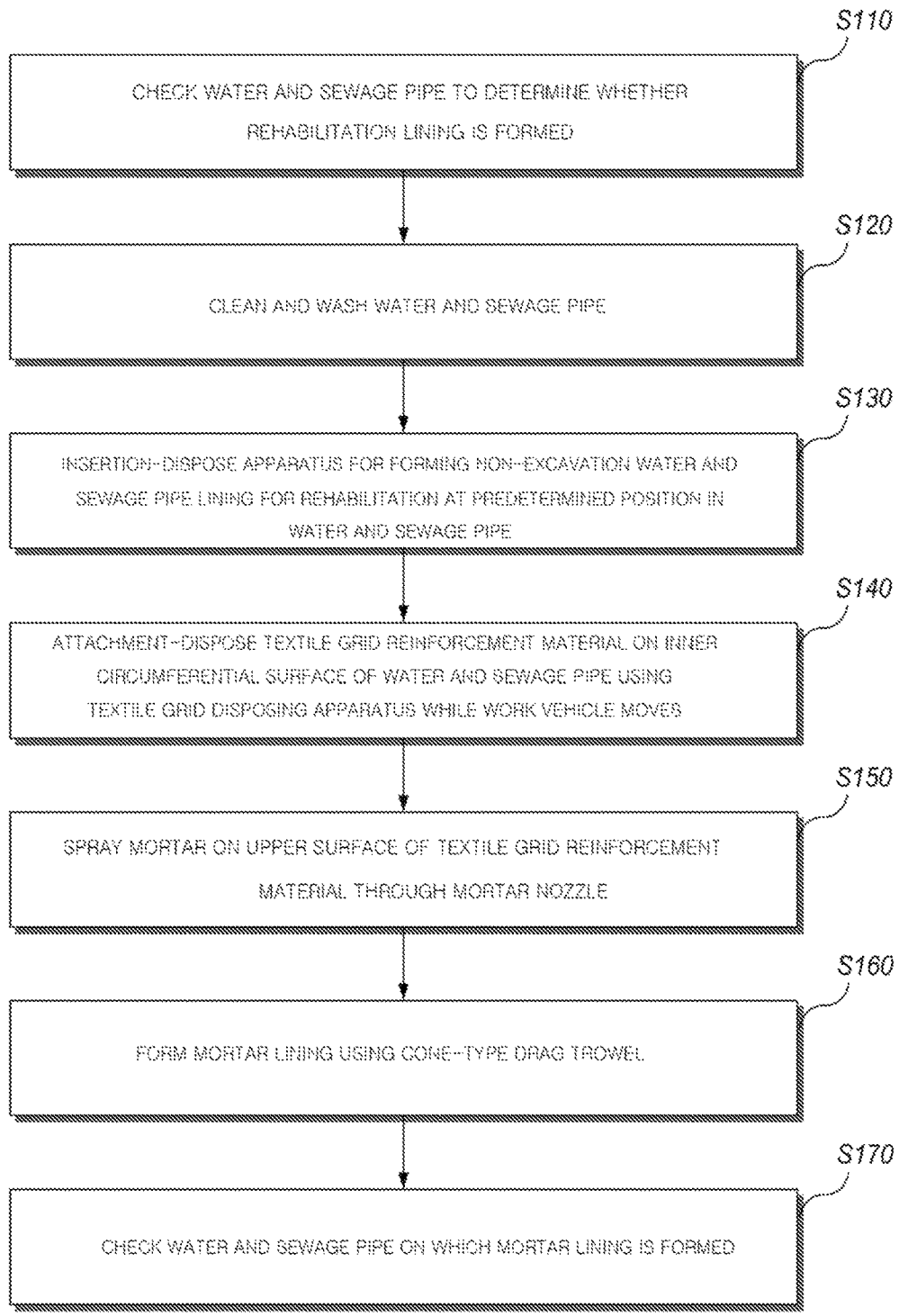
FIG. 9 is a process flowchart of a method of forming non-excavation water and sewage pipe lining for rehabilitation using a textile grid reinforcement material and mortar lining according to one embodiment of the present disclosure.

FIG. 9 is a process flowchart of a method of forming non-excavation water and sewage pipe lining for rehabilitation using a textile grid reinforcement material and mortar lining according to one embodiment of the present disclosure.

Referring to FIG. 9, the method for forming non-excavation water and sewage pipe lining for rehabilitation using a textile grid reinforcement material and mortar lining is as follows. First, a water and sewage pipe 100 is checked so as to determine whether rehabilitation lining is to be formed (S110).

The water and sewage pipe 100 to be subjected to for rehabilitation is cleaned and washed (S120).

The apparatus 400 for forming non-excavation water and sewage pipe lining for rehabilitation including a work vehicle 410, a textile grid disposing apparatus 420, a mortar nozzle 440, and a cone-type drag trowel 450 is inserted at a predetermined position in the water and sewage pipe 100 (S130).

A textile grid reinforcement material 200 is disposed to be pressed against an inner circumferential surface of the water and sewage pipe 100 while the work vehicle 410 moves (S140).

Mortar 310 is sprayed on an upper surface of the textile grid reinforcement material 200 through the mortar nozzle 440 (S150). In this case, the at least one apparatus 400 for forming non-excavation water and sewage pipe lining for rehabilitation according to one embodiment of the present disclosure may further include at least one camera 500 mounted on a rear side or a front side of work vehicle 410 which captures an image of the inside of the water and sewage pipe 100 and transfers the image to an external worker's terminal through a communication line 510. A movement speed of the work vehicle 410, attachment of the textile grid reinforcement material 200, and an amount of sprayed mortar of the mortar nozzle 440 may be adjusted while the image captured by the camera 500 is monitored through the external worker's terminal.

The mortar lining 300 is formed by the cone-type drag trowel 450 (S160). In this case, the cone-type drag trowel 450 includes a plurality of plastering scrapers 451 connected to one side of the propelling head 453 by a rivet 452 to be formed in an expanding or contracting structure, and the sliding plate 480 is installed in the cone-type drag trowel 450 so that a length of the second connection rod 470 is adjusted between the propelling head 453 and the sliding plate 480, and thus a diameter of the plastering scraper 451 can be accurately adjusted.

The water and sewage pipe 100 on which the mortar lining 300 is formed is checked (S170).

Therefore, the textile grid reinforcement material 200 wound around in a roll form is disposed in the water and sewage pipe 100 while the work vehicle 410 moves in the water and sewage pipe 100, the mortar 310 is applied to an upper surface of the textile grid reinforcement material 200 through the mortar nozzle 440, and the textile grid reinforcement material 200 with a predetermined thickness is attached to an inner circumferential surface of the water and sewage pipe 100 while the cone-type drag trowel 450 passes through a portion coated with the mortar 310, and thus the mortar lining 300 is completed.

According to one embodiment of the present disclosure, when an old water and sewage pipe is rehabilitated in a non-excavation method, a fine crack that may be caused on the mortar lining 300 is fundamentally suppressed, and thus service lifetime and safety is increased, and maintenance costs can be largely reduced. Further, the textile grid reinforcement material 200, which is a composite material, is applied, and thus a problem of corrosion of the reinforcement material that may be caused when a conventional reinforcing bar or a wire mesh is applied can be solved. When compared to the conventional method of forming the lining with only mortar, when the textile grid reinforcement material is applied, a thickness of the mortar lining can be reduced, and continuous construction can be performed, and thus economical construction can be performed.

According to the present disclosure, when an old water and sewage pipe is rehabilitated in a non-excavation method, a textile grid reinforcement material is continuously disposed, mortar lining is formed on an upper portion of the textile grid reinforcement material, and fine cracks that may be caused on the mortar lining are fundamentally suppressed, and thus service lifetime and safety can be increased, and maintenance costs can be greatly reduced.

According to the present disclosure, the textile grid reinforcement material, which is a composite material, is applied, and thus a problem of corrosion of the reinforcement material that may be caused when a conventional reinforcing bar or wire mesh is applied can be solved.

According to the present disclosure, when compared to a conventional method of forming the lining of only mortar, the textile grid reinforcement material is applied. Therefore, a thickness of mortar lining can be reduced, continuous construction can be performed, and thus economical construction can be performed.

The above description is only exemplary, and it should be understood by those skilled in the art that the present disclosure may be performed in other concrete forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present disclosure is defined not by the detailed description but by the appended claims and encompasses all modifications or alterations derived from meanings, the scope, and equivalents of the appended claims.

What is claimed is:

1. An apparatus for forming non-excavation water and sewage pipe lining for rehabilitation using a textile grid reinforcement material and mortar lining, the apparatus comprising:
a work vehicle disposed in a water and sewage pipe and towed or self-driven along a lower surface of the water and sewage pipe;
a textile grid disposing apparatus including a bobbin, wherein a textile grid reinforcement material is wound around the bobbin in a roll form and rotatably mounted on the work vehicle so that the textile grid reinforcement material is disposed to be pressed against an inner circumferential surface of the water and sewage pipe;
a mortar nozzle mounted on the work vehicle and configured to apply mortar so that the textile grid reinforcement material is attached to a wall of the water and sewage pipe; and
a cone-type drag trowel installed on a rear side of the work vehicle, connected to the work vehicle by connection rods, and configured to form mortar lining by finishing the mortar applied through the mortar nozzle, wherein the cone-type drag trowel is a cone-shaped plastering tool,
wherein the textile grid reinforcement material is continuously disposed on a wall of the water and sewage pipe and configured to form rehabilitation lining for the water and sewage pipe by applying the mortar to the textile grid reinforcement material through the mortar nozzle.

2. The apparatus of claim 1, wherein the textile grid reinforcement material wound around the bobbin in a roll form is disposed in the water and sewage pipe while the work vehicle moves in the water and sewage pipe, an upper surface of the textile grid reinforcement material is coated with the mortar through a plurality of mortar nozzles, the textile grid reinforcement material with a predetermined thickness is attached to an inner circumferential surface of the water and sewage pipe while the cone-type drag trowel passes through a portion coated with the mortar, and the mortar lining is completed.

3. The apparatus of claim 1, wherein the textile grid disposing apparatus is operated by a driving motor mounted in the work vehicle, and a gear box allows a rotation speed thereof to be automatically adjusted according to a movement distance of a work vehicle wheel and an inner diameter of the water and sewage pipe.

4. The apparatus of claim 3, wherein the textile grid disposing apparatus includes an outer pulley rotatably formed outside of one side of the work vehicle, a connection shaft connected to one side of the outer pulley, having an adjustable length, and connected with a bobbin shaft and a textile attachment-disposing rod, and the disposed textile grid reinforcement material unwound from the bobbin is attached to an inner side of the water and sewage pipe by the textile attachment-disposing rod.

5. The apparatus of claim 4, wherein the outer pulley is supported on an outer surface of a cage by a pair of taper bearings formed on an inner surface thereof, an internal gear is provided in an inner center of the outer pulley to receive power transferred from an outer gear of the gear box to rotate, and the cage has an opening so that the internal gear and the outer gear are engaged.

6. The apparatus of claim 4, wherein the textile grid disposing apparatus includes the bobbin shaft and the connection shaft connected by a hinge to have a predetermined angle therebetween.

7. The apparatus of claim 1, wherein the cone-type drag trowel includes a plurality of plastering scrapers formed on one side of a propelling head and connected by a rivet to be formed in an expanding or contracting structure, and a sliding plate installed in the cone-type drag trowel to adjust a length of second connection rod between the propelling head and a sliding plate so as to accurately adjust a diameter of the plastering scraper.

8. The apparatus of claim 1, further comprising at least one camera mounted on a front side or a rear side of the work vehicle to capture an image of the inside of the water and sewage pipe and transfer the image to an external worker's terminal through a communication line.

9. The apparatus of claim 8, wherein a driving speed of the work vehicle, an amount of sprayed mortar of the mortar nozzle, and attachment of the textile grid reinforcement material are adjusted while the image captured by the camera is monitored through the external worker's terminal.

10. A method of forming non-excavation water and sewage pipe lining for rehabilitation, the method comprising steps of:
(a) checking a water and sewage pipe to determine whether rehabilitation lining is to be formed;
(b) cleaning and washing the water and sewage pipe subject to the rehabilitation lining;
(c) insertion-disposing an apparatus for forming non-excavation water and sewage pipe lining for rehabilitation including a work vehicle, a textile grid disposing apparatus, a mortar nozzle, and a cone-type drag trowel at a predetermined position in the water and sewage pipe;
(d) disposing a textile grid reinforcement material to be pressed against an inner circumferential surface of the water and sewage pipe using the textile grid disposing apparatus while the work vehicle moves;
(e) spraying mortar onto an upper surface of the textile grid reinforcement material through the mortar nozzle;
(f) forming mortar lining using a cone-type drag trowel; and
(g) checking the water and sewage pipe on which the mortar lining is formed,
wherein the textile grid reinforcement material in the step (d) is continuously disposed on a wall of the water and sewage pipe, and the mortar nozzle applies the mortar to the textile grid reinforcement material to form water and sewage pipe lining for rehabilitation.

11. The method of claim 10, wherein the apparatus for forming non-excavation water and sewage pipe lining for rehabilitation comprises:
the work vehicle disposed in the water and sewage pipe and towed or self-driven along a lower surface of the water and sewage pipe;
the textile grid disposing apparatus including a bobbin, wherein a textile grid reinforcement material is wound around the bobbin in a roll form and rotatably mounted on the work vehicle so that the textile grid reinforcement material is disposed to be pressed against an inner circumferential surface of the water and sewage pipe;
a mortar nozzle mounted on the work vehicle and configured to apply mortar so that the textile grid reinforcement material is attached to a wall of the water and sewage pipe; and
a cone-type drag trowel installed on a rear side of the work vehicle, connected to the work vehicle by connection rods, and configured to form mortar lining by finishing the mortar applied through the mortar nozzle, wherein the cone-type drag trowel is a cone-shaped plastering tool.

12. The method of claim 11, further comprising at least one camera mounted on a front side or a rear side of the work vehicle to capture an image of an inside of the water and sewage pipe and configured to transfer the image to an external worker's terminal through a communication line.

13. The method of claim 11, wherein the textile grid disposing apparatus is operated by a driving motor mounted in the work vehicle, and a gear box allows a rotation speed thereof to be automatically adjusted according to a movement distance of a work vehicle wheel and an inner diameter of the water and sewage pipe.

14. The method of claim 13, wherein the textile grid disposing apparatus includes an outer pulley rotatably formed outside of one side of the work vehicle, a connection shaft connected to one side of the outer pulley and connected with a bobbin shaft and a textile attachment-disposing rod, and the disposed textile grid reinforcement material unwound from the bobbin is attached to an inner side of the water and sewage pipe by the textile attachment-disposing rod.

15. The method of claim 14, wherein the outer pulley is supported on an outer surface of a cage by a pair of taper bearings formed on an inner surface thereof, an internal gear is provided in an inner center of the outer pulley to receive power transferred from an outer gear of the gear box to rotate, and the cage has an opening so that the internal gear and the outer gear are engaged.

16. The method of claim 14, wherein the textile grid disposing apparatus includes the bobbin shaft and the connection shaft connected by a hinge with a predetermined angle therebetween.

17. The method of claim 11, wherein the cone-type drag trowel includes a plurality of plastering scrapers formed on one side of a propelling head and connected by a rivet to be formed in an expanding or contracting structure, and a sliding plate installed in the cone-type drag trowel to adjust a length of second connection rod between the propelling head and a sliding plate so as to accurately adjust a diameter of plastering scraper.

* * * * *